(12) United States Patent
Armstrong et al.

(10) Patent No.: US 10,331,515 B2
(45) Date of Patent: Jun. 25, 2019

(54) COMPUTING SYSTEM WITH SHIFT DATA PROTECTION MECHANISM AND METHOD OF OPERATION THEREOF

(71) Applicant: CNEXLABS, Inc., San Jose, CA (US)

(72) Inventors: Alan Armstrong, Los Altos, CA (US); Patrick Lee, San Jose, CA (US)

(73) Assignee: CNEX LABS, Inc., San Jose, CA (US)

( * ) Notice: Subject to any disclaimer, the term of this patent is extended or adjusted under 35 U.S.C. 154(b) by 187 days.

(21) Appl. No.: 14/965,779

(22) Filed: Dec. 10, 2015

(65) Prior Publication Data

US 2016/0170832 A1   Jun. 16, 2016

Related U.S. Application Data

(60) Provisional application No. 62/090,276, filed on Dec. 10, 2014.

(51) Int. Cl.
*G06F 11/10* (2006.01)
*G06F 11/273* (2006.01)

(52) U.S. Cl.
CPC .............................. *G06F 11/1076* (2013.01)

(58) Field of Classification Search
CPC .. G06F 11/1076; G06F 3/0619; G06F 3/0629; G06F 3/064; G06F 3/0673
See application file for complete search history.

(56) References Cited

U.S. PATENT DOCUMENTS

| | | | | |
|---|---|---|---|---|
| 4,556,978 A | * | 12/1985 | Kregness | G06F 11/10 708/531 |
| 5,721,739 A | * | 2/1998 | Lyle | G06F 11/1068 714/755 |
| 7,061,849 B1 | * | 6/2006 | Yamaguchi | G11B 20/1217 369/53.35 |
| 8,261,159 B1 | * | 9/2012 | Sommer | G06F 11/1048 713/193 |
| 2006/0036926 A1 | * | 2/2006 | Hocevar | H03M 13/118 714/758 |
| 2011/0252184 A1 | * | 10/2011 | Cho | G06F 3/0608 711/102 |
| 2012/0311394 A1 | * | 12/2012 | Masuo | G06F 11/0727 714/746 |
| 2013/0080862 A1 | * | 3/2013 | Bennett | G06F 11/1076 714/782 |
| 2013/0104005 A1 | * | 4/2013 | Weingarten | G06F 11/1068 714/773 |
| 2015/0248331 A1 | * | 9/2015 | Armstrong | G06F 11/1076 714/764 |
| 2015/0309860 A1 | | 10/2015 | Mittelholzer et al. | |

(Continued)

*Primary Examiner* — April Y Blair
*Assistant Examiner* — Dipakkumar B Gandhi
(74) *Attorney, Agent, or Firm* — Perspectives Law Group, Corp.

(57) ABSTRACT

A computing system includes: a data block including data pages and each of the data pages includes data sectors and each of the data sectors include sector data and a sector redundancy; a storage engine, coupled to the data block, configured to: apply a first protection across the data pages includes shifted parities generated, apply a second protection across the data sectors, and correct at least one of the data sectors when a sector correction with the sector redundancy failed by selecting one of the shifted parities for the first protection and the second protection.

30 Claims, 8 Drawing Sheets

(56) References Cited

U.S. PATENT DOCUMENTS

2015/0331741 A1 11/2015 Park et al.
2015/0347230 A1 12/2015 Anholt et al.
2015/0363262 A1 12/2015 Hu et al.
2016/0055882 A1 2/2016 Cideciyan et al.

* cited by examiner

COMPUTING SYSTEM WITH SHIFT DATA PROTECTION MECHANISM AND METHOD OF OPERATION THEREOF

CROSS-REFERENCE TO RELATED APPLICATION(S)

This application claims the benefit of U.S. Provisional Patent Application Ser. No. 62/090,276 filed Dec. 10, 2014, and the subject matter thereof is incorporated herein by reference thereto.

TECHNICAL FIELD

An embodiment of the present invention relates generally to a computing system, and more particularly to a system for data protection.

BACKGROUND

Modern consumer and industrial electronics, especially devices such as graphical computing systems, televisions, projectors, cellular phones, portable digital assistants, and combination devices, are providing increasing levels of functionality to support modern life including three-dimensional display services. Research and development in the existing technologies can take a myriad of different directions. As data become more pervasive, existing and new systems need to interoperate and provide data reliability.

Thus, a need still remains for a computing system with shift data protection mechanism to provide improved data reliability and recovery. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an apparatus, including a data block including data pages and each of the data pages includes data sectors and each of the data sectors include sector data and a sector redundancy; a storage engine, coupled to the data block, configured to: apply a first protection across the data pages includes shifted parities generated, apply a second protection across the data sectors, and correct at least one of the data sectors when a sector correction with the sector redundancy failed by selecting one of the shifted parities for the first protection and the second protection.

An embodiment of the present invention provides a method including providing a data block including data pages and each of the data pages includes data sectors and each of the data sectors include sector data and a sector redundancy; applying a first protection across the data pages including generating shifted parities; applying a second protection across the data sectors; and correcting at least one of the data sectors when a sector correction with the sector redundancy failed by selecting one of the shifted parities for the first protection and the second protection.

An embodiment of the present invention provides a non-transitory computer readable medium including: providing a data block including data pages and each of the data pages includes data sectors and each of the data sectors include sector data and a sector redundancy; applying a first protection across the data pages including generating shifted parities; applying a second protection across the data sectors; and correcting at least one of the data sectors when a sector correction with the sector redundancy failed by selecting one of the shifted parities for the first protection and the second protection.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
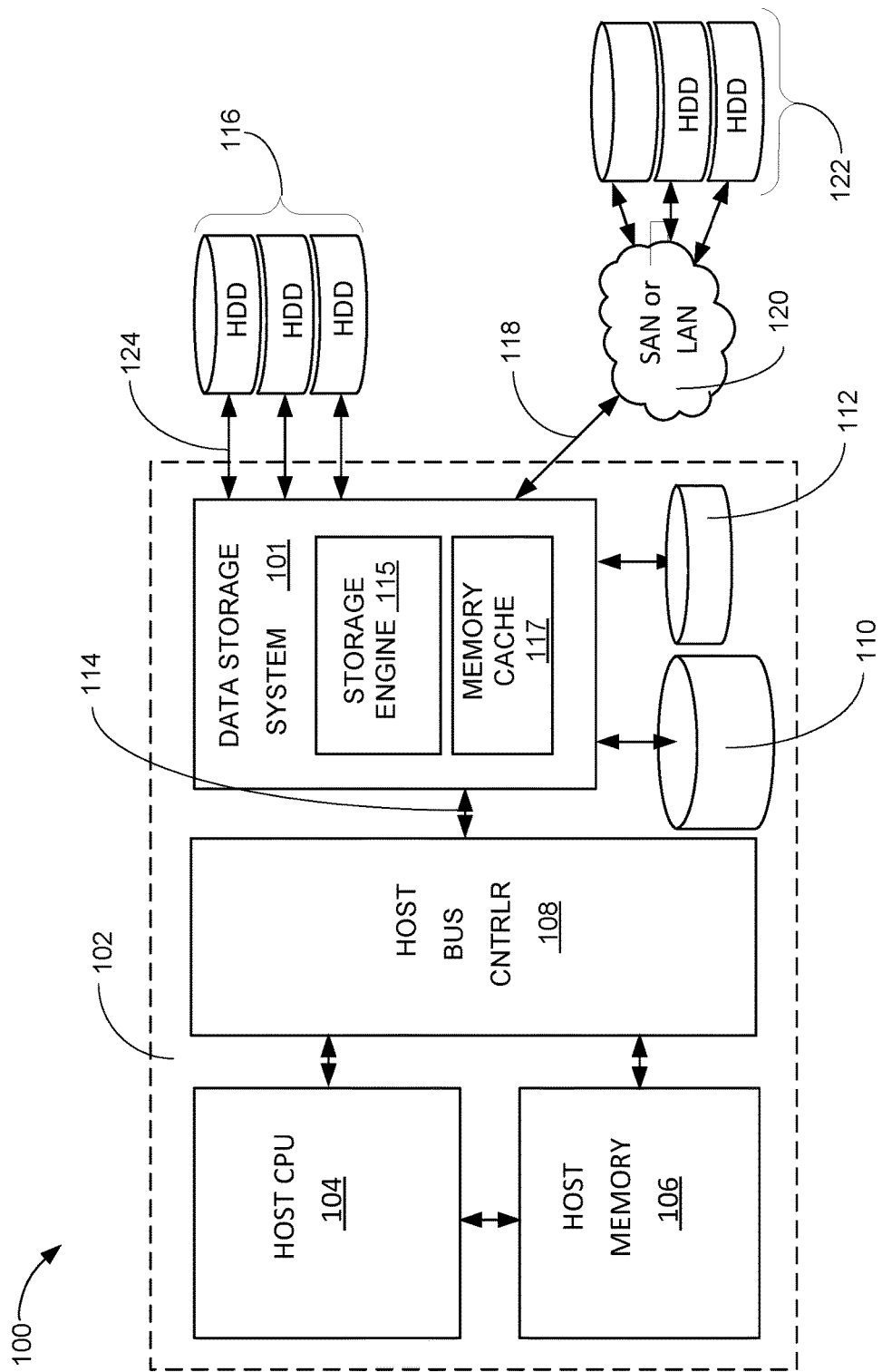
FIG. 1 is a computing system with shift data protection mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims. The term "unit" referred to herein can include hardware only implementations, where performance requirements preclude the use of software.

Referring now to FIG. 1, therein is shown a computing system 100 with data protection mechanism in an embodiment of the present invention. The computing system 100 is depicted in FIG. 1 as a functional block diagram of the computing system 100 with a data storage system 101. The functional block diagram depicts the data storage system 101 installed in a host computer 102.

As an example, the host computer 102 can be as a server or workstation. The host computer 102 can include at least a host central processing unit 104, host memory 106 coupled to the host central processing unit 104, and a host bus controller 108. The host bus controller 108 provides a host interface bus 114, which allows the host computer 102 to utilize the data storage system 101.

It is understood that the function of the host bus controller 108 can be provided by host central processing unit 104 in some implementations. The host central processing unit 104 can be implemented with hardware circuitry in a number of different manners. For example, the host central processing unit 104 can be a processor, an application specific integrated circuit (ASIC) an embedded processor, a microprocessor, a hardware control logic, a hardware finite state machine (FSM), a digital signal processor (DSP), or a combination thereof.

The data storage system 101 can be coupled to a solid state disk 110, such as a non-volatile memory based storage device having a peripheral interface system, or a non-volatile memory 112, such as an internal memory card for expanded or extended non-volatile system memory.

The data storage system 101 can also be coupled to hard disk drives (HDD) 116 that can be mounted in the host computer 102, external to the host computer 102, or a combination thereof. The solid state disk 110, the non-volatile memory 112, and the hard disk drives 116 can be considered as direct attached storage (DAS) devices, as an example.

The data storage system 101 can also support a network attach port 118 for coupling a network 120. Examples of the network 120 can be a local area network (LAN) and a storage area network (SAN). The network attach port 118 can provide access to network attached storage (NAS) devices 122.

While the network attached storage devices 122 are shown as hard disk drives, this is an example only. It is understood that the network attached storage devices 122 could include magnetic tape storage (not shown), and storage devices similar to the solid state disk 110, the non-volatile memory 112, or the hard disk drives 116 that are accessed through the network attach port 118. Also, the network attached storage devices 122 can include just a bunch of disks (JBOD) systems or redundant array of intelligent disks (RAID) systems as well as other network attached storage devices 122.

The data storage system 101 can be attached to the host interface bus 114 for providing access to and interfacing to multiple of the direct attached storage (DAS) devices via a cable 124 for storage interface, such as Serial Advanced Technology Attachment (SATA), the Serial Attached SCSI (SAS), or the Peripheral Component Interconnect-Express (PCI-e) attached storage devices.

The data storage system 101 can include a storage engine 115 and memory devices 117. The storage engine 115 can be implemented with hardware circuitry, software, or a combination thereof in a number of ways. For example, the storage engine 115 can be implemented as a processor, an application specific integrated circuit (ASIC) an embedded processor, a microprocessor, a hardware control logic, a hardware finite state machine (FSM), a digital signal processor (DSP), or a combination thereof.

The storage engine 115 can control the flow and management of data to and from the host computer 102, and from and to the direct attached storage (DAS) devices, the network attached storage devices 122, or a combination thereof. The storage engine 115 can also perform data reliability check and correction, which will be further discussed later. The storage engine 115 can also control and manage the flow of data between the direct attached storage (DAS) devices and the network attached storage devices 122 and amongst themselves. The storage engine 115 can be implemented in hardware circuitry, a processor running software, or a combination thereof.

For illustrative purposes, the storage engine 115 is shown as part of the data storage system 101, although the storage engine 115 can be implemented and partitioned differently. For example, the storage engine 115 can be implemented as part of in the host computer 102, implemented partially in software and partially implemented in hardware, or a combination thereof. The storage engine 115 can be external to the data storage system 101. As examples, the storage engine 115 can be part of the direct attached storage (DAS) devices described above, the network attached storage devices 122, or a combination thereof. The functionalities of the storage engine 115 can be distributed as part of the host computer 102, the direct attached storage (DAS) devices, the network attached storage devices 122, or a combination thereof.

The memory devices 117 can function as a local cache to the data storage system 101, the computing system 100, or a combination thereof. The memory devices 117 can be a volatile memory or a nonvolatile memory. Examples of the volatile memory can be static random access memory (SRAM) or dynamic random access memory (DRAM).

The storage engine 115 and the memory devices 117 enable the data storage system 101 to meet the performance requirements of data provided by the host computer 102 and store that data in the solid state disk 110, the non-volatile memory 112, the hard disk drives 116, or the network attached storage devices 122.

For illustrative purposes, the data storage system 101 is shown as part of the host computer 102, although the data storage system 101 can be implemented and partitioned differently. For example, the data storage system 101 can be implemented as a plug-in card in the host computer 102, as part of a chip or chipset in the host computer 102, as partially implement in software and partially implemented in hardware in the host computer 102, or a combination thereof. The data storage system 101 can be external to the host computer 102. As examples, the data storage system 101 can be part of the direct attached storage (DAS) devices described above, the network attached storage devices 122, or a combination thereof. The data storage system 101 can be distributed as part of the host computer 102, the direct attached storage (DAS) devices, the network attached storage devices 122, or a combination thereof.

Figure 2:
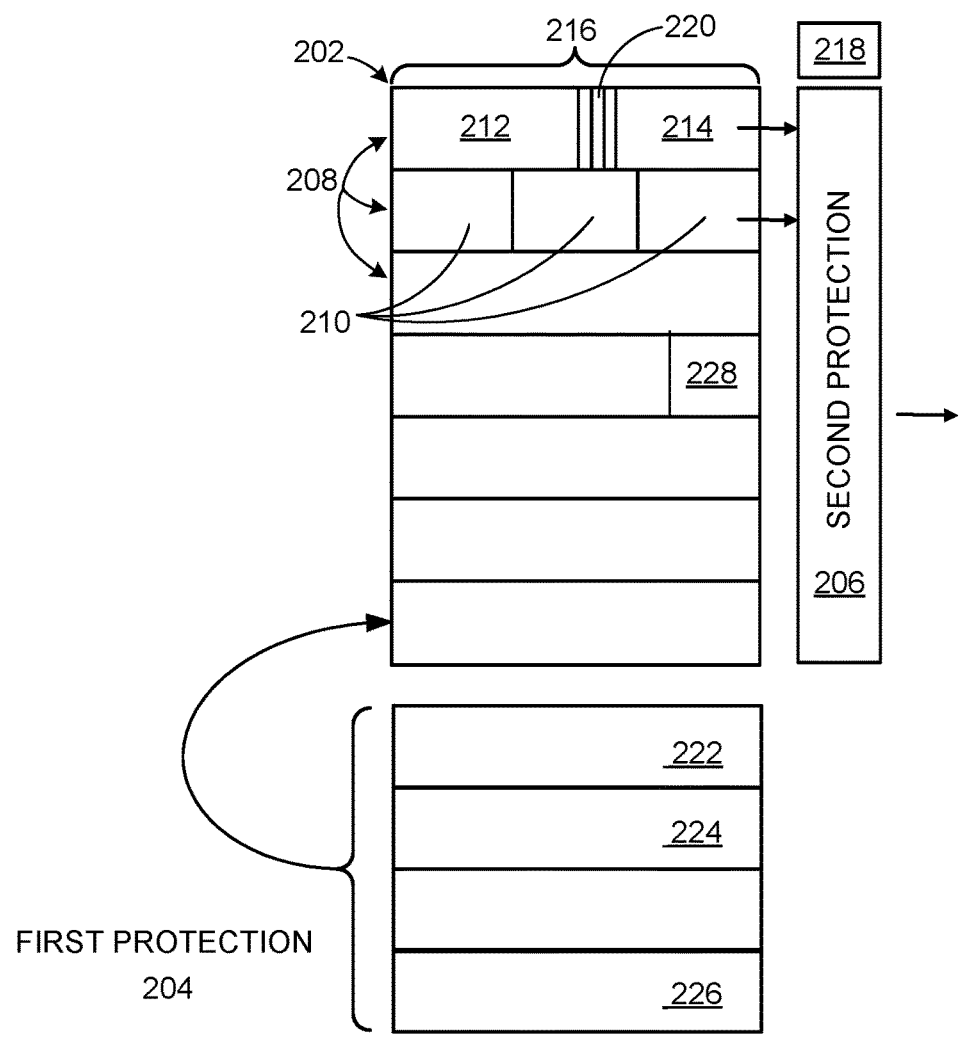
FIG. 2 depicts architectural views of the shift data protection mechanism in an embodiment.

Referring now to FIG. 2, therein is shown an architectural view of a data protection mechanism in an embodiment. The architectural view of the data protection mechanism depicts a data block 202, a first protection 204, and a second protection 206. The first protection 204 is a column protection that can detect and correct errors in the particular column of the data block 202. The second protection 206 is shown on the right-hand side of the data block 202 and is a row protection that can detect and correct errors in the particular row of the data block 202.

The data block 202 includes data to be protected. The data block 202 represent physical storage that can contain information transferred from or to the host memory 106 of FIG. 1. The data block 202 can include storage elements from the host computer 102, the network attached storage devices 122, the DAS devices, or a combination thereof. As a more specific example, the data block 202 can represent physical storage including the memory devices 117, the solid state disk 110, the non-volatile memory 112, the hard disk drives 116 or a combination thereof. The data block 202 can also represent a super block, which represents is a subdivision of a larger storage subsystem. When a storage device is too large to address directly a super block can be used to account for a portion of the storage capacity. As an example, the super block can contain up to a maximum addressable space (in 32 bit addressing that is 4 GB) the number of super blocks can form the entire capacity. An example application where a super block can be utilized is in flash memory where the accounting of wear activity must be maintained for data protection and wear leveling.

The data block 202 can include and be organized into data pages 208. Each of the data pages 208 can include data sectors 210. As an example, the data block 202 can be distributed across multiple devices, such as host computer 102, the direct attached storage (DAS) devices, the network attached storage devices 122, or a combination thereof.

As an example, the data protection mechanism for the data block 202 can be implemented as a 2D RAID parity with the first protection 204, the second protection 206, or a combination thereof. In this example, the data block 202 can be a RAID block. The data page 208 can represent data organized in groups of the data sectors 210. Each of the data pages 208 can include a fixed number of the data sectors 210. Each of the data sectors 210 can include sector data 212 and the sector redundancy 214, which can be an error correction block for the sector data 212. The sector data 212 and a sector redundancy 214 can make up a codeword 216. The sector redundancy 214 provides capabilities for the error detection, error correction, or a combination thereof for the sector data 212 with which it is associated.

Examples of sector redundancy 214 include error correction codes (ECC), a cyclic redundancy check (CRC), or other types of error detection or correction schemes. As more specific examples, the sector redundancy 214 can be systematic code or nonsystematic code, a block code, or a convolution code. As further examples, the sector redundancy 214 can be a Reed-Solomon code or low density parity check (LDPC) code. The entirety of the data page 208 can be used as the codeword 216 for error detection and correction for, by example, an LDPC checker hardware structure (not shown).

Further the first protection 204 can utilize soft information 218 associated with the data page 208. The soft information 218 is provides some measure of reliability from a channel. Examples of the soft information can include Flash Log-Likelihood-Ratio (LLR) and can be utilized by the first protection 204.

If it is uncorrectable, the computing system 100 can apply RAID assisted decoding. As a more specific example, the codeword 216 can be a Bose, Chaudhuri, and Hocquenghem (BCH) codeword and the data protection mechanism as the RAID parity.

For illustrative purposes, the codeword 216 is descried as a BCH codeword, although it is understood the codeword 216 can be other types using different error detection and correction codes. For example, other block codes can be utilized to form the codeword 216. As more specific examples, the codeword 216 can be formed with Reed-Solomon code or LDPC code.

For illustrative purposes, an embodiment is described with two-dimensional (2D) protection for the data block 202 with the first protection 204 and the second protection 206, although it is understood that various embodiments are not limited to 2D protection. For example, other protection can be applied to the same data block 202, the same data sectors 210, or a combination thereof similarly as the first protection 204, the second protection 206, or a combination thereof for N-dimensional protection. As example, various embodiments can be for further protection applied to the data block 202, the data sectors 210, or a combination thereof for 3D, 4D, 5D, etc. protection.

The first protection 204 can also be considered as part of the data block 202 and as one or a plurality of the data page 208. The first protection 204, in this example, can be considered one sector data 212 used as RAID parity page for other instances of the sector data 212 within the data page 208 of the data block 202. The first protection 204 can also be other error correction or error detection scheme.

The first protection 204 can also be extended to include multiple of the data pages 208 within the data block 202. In this example, the first protection 204 can include a zero-shifted protection 222, a one-shifted protection 224, and so on through a N-shifted protection 226. The number of shifts (N) represents the calculation for each row of the first protection 204 with the protection symbols 220 from the data pages 208 as well as the first protection 204.

Each of the protection symbols 220 represents a number of data or information units in the data page 208. For example, each of the protection symbols 220 can be a bit or can be number of bits or tuple, such as a byte (8 bits).

In this example, the zero-shifted protection 222 is computed with the protection symbols 220 directly above with the corresponding symbol of the zero-shifted protection 222 from each of the data pages 208 at the same relative location or column within the data block 202. The one-shifted protection 224 is computed with the relative symbol location L of the data page 208 to the next shifted location L+1 of the next data page 208. The N-shifted protection 226 is computed with the relative symbol location from one row of the data pages 208 to the next shifted by N locations. The N-shifted protection 226 can also be computed with the symbols from the zero-shifted protection 222 through the row above the N-shifted protection 226 in the first protection 204.

The second protection 206 can be implemented as a protection for each of the data sectors 210 in each of the data page 208 and can include a page parity sector 228 for the remaining data sectors 210 in one of the data page 208.

One embodiment of the first protection 204 can be as the RAID parity page and can include providing parity information across the data page 208 in the data block 202, which can be viewed as a RAID block. There are at least 2 ways in which this can be accomplished.

In an embodiment, the zero-shifted protection 222 of the first protection 204 can be used as the RAID parity page to represent the parity of the sum of all the data pages 208 in the data block 202 as the RAID block. The zero-shifted protection 222 would store the RAID parity on a sector-by-sector basis because the data page 208 and the zero-shifted protection 222 contain the same number of data bytes in the data sectors 210.

In this approach, the first protection 204 as the RAID parity page could be formatted like the data page 208 where each of the data sectors 210 is protected by the sector redundancy 214, such as an ECC. Here, the payload for the data sectors 210 is the parity for payloads of the data page 208. However, there are 3 possibilities for the parity sector, as an example.

First, the parity sector could be used for the page parity like the parity sector for the remaining data sectors 210 on the data page 208. However, this means that the parity sectors on the data page 208 in the data block 202 will not be protected by the RAID parity.

Second, the parity sector could be used for parity for the parity sectors on the data page 208. In this case, the first protection 204 as the RAID parity page would not have page parity information.

Third, there could be two parity sectors. An embodiment can provide parity information for the sectors in the RAID parity page, as the first protection 204, and the other would provide parity information for all the parity sectors in the data block 202 with the second protection 206.

An embodiment of the present invention provides iterative RAID assisted decoding. For this embodiment, the first protection 204 is described as the RAID parity page for third example above. In this case all parity sectors as a portion of the data sectors 210 are covered by RAID parity and the RAID parity page behaves like the data page 208.

Figure 3:
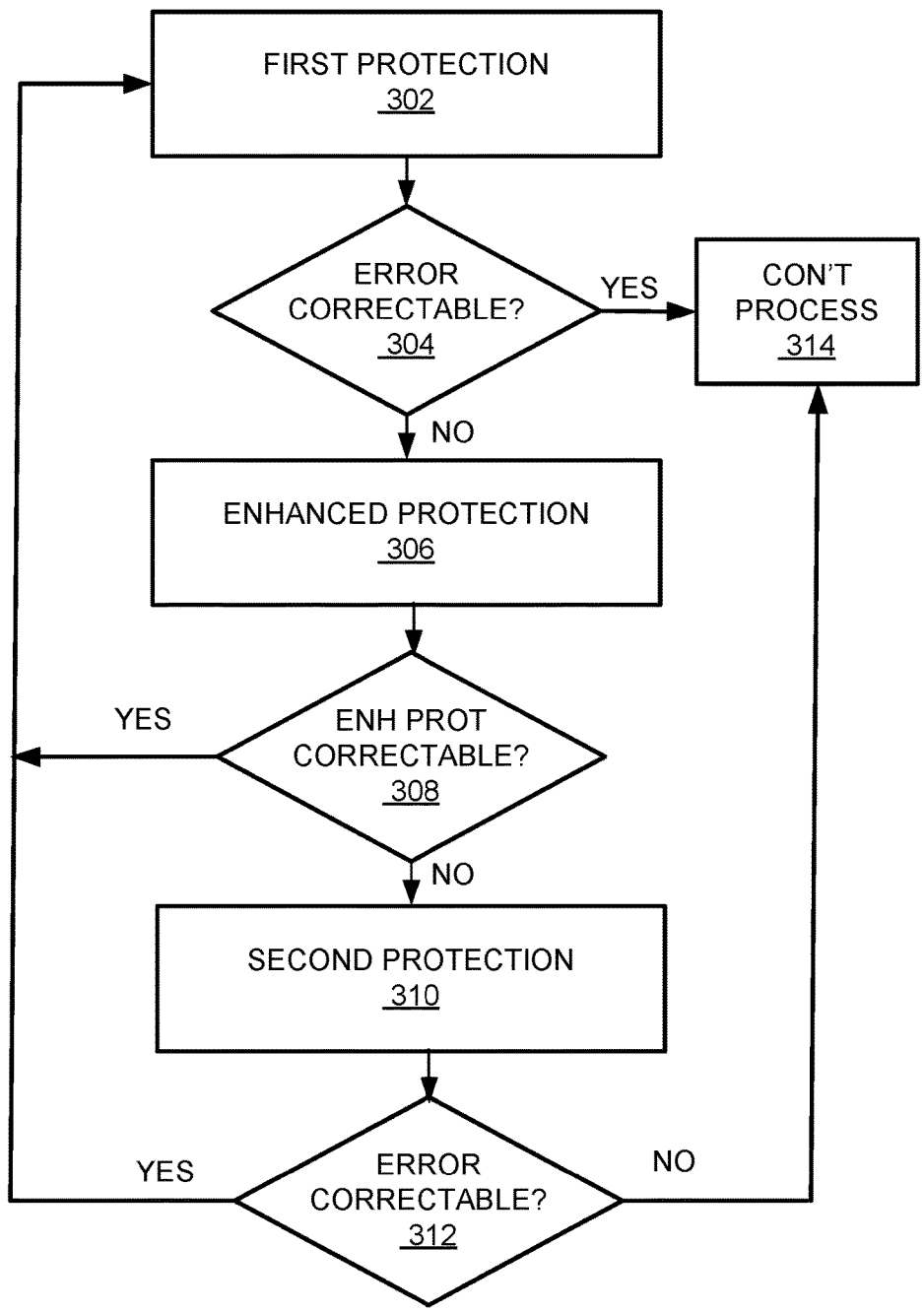
FIG. 3 is a flow chart of the computing system in an embodiment of the present invention.

Referring now to FIG. 3, therein is shown a flow chart of the computing system 100 in an embodiment of the present invention. In this embodiment, the computing system 100 can decode the entire data block 202 of FIG. 2 as a RAID block. In a first protection block 302, the computing system 100 can first attempt to correct each of the data sectors 210 of FIG. 2 using the sector redundancy 214 of FIG. 2 as the sector ECC.

Further the first protection 204 of FIG. 2 can utilize soft information 218 of FIG. 2 associated with the data page 208 of FIG. 2. The soft information 218 can provide some measure of reliability of a channel. Examples of the soft information can include Flash Log-Likelihood-Ratio (LLR) and can be utilized by the first protection 204.

As a further example, the soft information 218 can also be obtained for the nonvolatile memory 112 of FIG. 1. As a specific example, the nonvolatile memory 112 can include a multi-level cell (MLC) with coupled page and error transition probability due to the degradation that can result in MLC type for the nonvolatile memory 112. For a two-bit per cell example for a MLC nonvolatile memory 112, there are likely errors using Gray code:

11 -> 10
10 -> 00
00 -> 01

In this example, the above transitions are the likely error transition state. And in MLC nonvolatile memory 112, the most significant bit (MSB) page and least significant bit (LSB) page are in different memory page. By reading the error page's coupled page, the computing system 100 can determine the current states of both MSB page and LSB page. From the current states, the computing system 100 can figure out what is the likely state of the correct data. For example, if the error data unit is in MSB page and through XOR, the computing system 100 found a total set of likely error locations which can be the sum of more than one error data unit. The computing system 100 can read the LSB page of the error data unit. And computing system 100 can determine or calculate out the transition state possibility as shown in the table, as illustrated below:

| Current State | Current MSB | Likely Flip |
|---|---|---|
| 11 | 1 | No |
| 10 | 0 | No |
| 00 | 0 | Yes |
| 01 | 1 | No |

If the current error data unit is LSB page, then the nonvolatile memory 112 can include the likely transition of the state as in the following table:

| Current State | Current LSB | Likely Flip |
|---|---|---|
| 11 | 1 | No |
| 10 | 0 | Yes |
| 00 | 0 | No |
| 01 | 1 | Yes |

By reviewing at the summation of multiple page error pattern and the coupled page current state, the computing system 100 can narrow down the error bit assuming that different pages will have different current state value. For MSB bit page, the computing system 100 can mask out on average 75% of the bits in the data unit for error flip, as an example. For LSB bit page, the computing system 100 can mask out on average 25% of the bits in the data unit for error flip.

Returning to the description of the flow chart, if the first protection block 302 is successful as determined by an error corrected block 304, then the process can continue to process the data sector 210 in a continue processing block 314, which can continue verifying the data block 202. If it is uncorrectable as determined in the error corrected block 304, the computing system 100 can apply RAID assisted decoding. As a more specific example, the codeword 216 of FIG. 2 can be a Bose, Chaudhuri, and Hocquenghem (BCH) codeword and the data protection mechanism as a RAID parity as noted above.

For illustrative purposes, the codeword 216 is described as a BCH codeword, although it is understood the codeword 216 can be other types using different error detection and correction codes. For example, other block codes can be utilized to form the codeword 216. As more specific examples, the codeword 216 can be formed with Reed-Solomon code or Low Density Parity Check (LDPC) code.

Returning the example, where the codeword 216 is a BCH codeword, the first protection 204 and the second protection 206 of FIG. 2 can be represented by Q and R, respectively. Let $Q=\{q_i, i=1, \ldots, q\}$ and $R=\{r_i, i=1, \ldots, r\}$, where $q_i$ and $r_i$ are binary vectors of length n. In particular, $q_i$, $i=1, \ldots, q-1$ and $r_i$, $i=1, \ldots, r-1$ are BCH codeword vectors where and $q_q$ and $r_r$ the parity check vectors defined by $$q_q = c + \sum_{k=1}^{q-1} q_k \text{ and } r_r = c + \sum_{k=1}^{r-1} r_k \quad \text{(Equation 1)}$$

Assuming that c is uncorrectable in the error corrected block 304, the computing system 100 with a first enhanced protection block 306 compute the parities:

$$p_Q = c + \sum_{k=1}^{q} q_i \text{ and } p_R = c + \sum_{k=1}^{r} r_i \quad \text{(Equation 2)}$$

Next, the first enhanced protection block 306 generate the vector s bit-wise AND ($\wedge$) for $p_Q$ and $p_R$:

$$s = p_Q \wedge p_R \quad \text{(Equation 3)}$$

where $s(i) = p_Q(i) \wedge p_R(i)$ is the $i^{th}$ bit of s.

Equations 1 through 3 can represent the actions performed with the zero-shifted protection 222 of FIG. 2. For clarity, the zero-shifted protection 222 portion of the first protection 204 will be described before expanding the description to include the one-shifted protection 224 of FIG. 2 through the N-shifted protection 226 of FIG. 2.

The computing system 100 can apply the BCH correcting to the resulting word (i.e. s+c). If c is the only erroneous codeword and s(i)=1 then c(i) is incorrect and will be corrected by this procedure.

If c(i) is incorrect the procedure fails to correct it if there are an odd number of error patterns in Q or R that have an error in position i. This is because at least one of the parity checks will be satisfied so s(i)=0. In addition, if c(i) is correct, then s(i)=1 if both Q and R contain and odd number of error patterns. In this case, the procedure forces c(i) to be incorrect. On the other hand, c(i) will be corrected if there are $0, 2, \ldots, \lfloor q/2 \rfloor$ errors for Q and $0, 2, \ldots, \lfloor r/2 \rfloor$ for R in position i.

Assume c has e>t and that we correct u errors and introduce v errors. The procedure fails if $$e-u+v>t \quad \text{(Equation 4)}$$

In other words, the computing system 100 can attempt to correct c by first flipping protection symbols 220, or in this example each of the protection symbols 220 is a bit, of FIG. 2 in c corresponding to the nonzero positions in s. Where the computing system 100 flip the protection symbols 220 in the uncorrectable sector, as determined by an enhanced correctable block 308, corresponding to the nonzero protection symbols 220 in where Q and R are the page and RAID parities and attempt correction again, iterating back to the first protection block 302, with the sector redundancy 214 in a second protection block 310. If the one of the data sectors 210 being decoded is still uncorrectable as determined in an enhanced corrected block 312, then an embodiment can continue to apply RAID assisted decoding to the other data page 208 in the data block 202 by iterating back to the first protection block 302.

As a more specific example, the computing system 100 can choose the first sector from the data sectors 210 of FIG. 2 on the first page from the data page 208 as the "target" sector, which can be used to measure performance. The computing system 100 can generate all the data pages 208 in the data block 202. In the first protection block 302, the computing system 100 then attempt to decode every one of the data sectors 210 in the target instance of the data page 208 using the sector redundancy 214 of FIG. 2, such as the sector ECC, for each of the data sectors 210. If the target sector is correctable, as determined in the error corrected block 304, then an embodiment can be done or continue to process the data sector in the continue processing block 314, otherwise an embodiment can apply RAID assist for the target sector in the first enhanced protection block 306. If this fails as determined in the enhanced corrected block 312, the computing system 100 continues to apply RAID assist to each uncorrectable instance of the data sectors 210 in the target instance of the data page 208 and iterated to verify the data blaoc 202.

Whenever RAID assist is successful on a previously uncorrectable instance of the data sectors 210, the computing system 100 can reapply RAID assist for the target sector. This is repeated until the computing system 100 is able to correct the target sector or the computing system 100 has applied RAID assist to every uncorrectable instance of the data sectors 210 in the target sector. If the computing system 100 has attempted correction on every uncorrectable instance of the data sectors 210 on the target page, the computing system 100 repeat the correction process with the next instance of the data page 208. This continues, until the computing system 100 has processed all the data pages 208 or the computing system 100 is able to correctly decode the target sector.

In a further embodiment, the second protection 206 can be implemented with a row-enhanced Hamming code, which is expressed in the following matrix:

$$H = \begin{bmatrix} 1 & 1 & 1 & 1 & 1 & 1 & 1 \\ 1 & 0 & 1 & 0 & 1 & 0 & 1 \\ 0 & 1 & 1 & 0 & 0 & 1 & 1 \\ 0 & 0 & 0 & 1 & 1 & 1 & 1 \end{bmatrix} \quad \text{(Matrix 1)}$$

The row-enhanced Hamming code, as shown in Matrix 1, provides an all 1's row to the parity check matrix expressed below:

$$H = \begin{bmatrix} 1 & 0 & 1 & 0 & 1 & 0 & 1 \\ 0 & 1 & 1 & 0 & 0 & 1 & 1 \\ 0 & 0 & 0 & 1 & 1 & 1 & 1 \end{bmatrix} \quad \text{(Matrix 2)}$$

Matrix 2 is an example of a parity check matrix for an m-bit Hamming code can be constructed by choosing the columns to be all the nonzero binary vectors of length m. Matrix 2 is an example of a parity check matrix for m=3. For this example of H in matrix 2, a nonzero syndrome is the binary representation of the error location. For example, if the received word, w, has an error in location 6, then $N=wH^T=[0\ 1\ 1] \Leftrightarrow 6$.

The row-enhanced Hamming code includes the parity row providing that every combination of 3 columns of row-enhanced Hamming code is linearly independent. As a result, it follows that the Hamming parity code has minimum distance at least 4. In addition, we also note for this choice of H for the row-enhanced Hamming code, we can still identify the error location by shifting the syndrome, left one bit (i.e. shift out the parity check bit).

Returning to the case where the first protection 204 includes the zero-shifted protection 222, the one-shifted protection 224, through the N-shifted protection 226.

As an example, the data block 202 of FIG. 2 can be viewed as an r×n symbol or binary matrix, $D=[d_{i,j}]$, where $d_{i,j} \in \{0, 1\}$, i=, 0, 1, ..., r−1, j=0, 1, ..., n−1. Each row in D is a codeword 216 of FIG. 2 of an error-correcting code (ECC) such as a BCH or LDPC code or the sector redundancy 214 of FIG. 2. The columns of D can then encoded by a column code for the first protection 204, such as a simple parity check code where the check bit for column j is $$p_j = \left(\sum_{i=0}^{r-1} d_{i,j}\right) \mod 2.$$

The encoded matrix, C, is an (r+1)×n matrix where the first r rows could be the rows of D and the last row could be the check bits for the column parity check code. For a case where the first protection 204 is symbol based, e.g. more than one bit, then C can be a matrix where the "1" can be "m" representing the number of bits per symbol or m-tuple.

For the for the permuted product code, we first generate a permuted matrix $\tilde{C}=[\tilde{c}_{i,j}]$, i=0, 1, ..., r, j=0, 1, ..., n−1, using a 1-1 permutation of $C=[c_{i,j}]$. The permutation parity is computed as $$\tilde{p}_j = \left(\sum_{i=0}^{r} \tilde{c}_{i,j}\right) \mod 2$$

(i.e. column parities for the permuted matrix) where i is the row and j is the column in the matrix.

One simple permutation is to first cyclically shifting right each row of C according to $\tilde{c}_{i,(i+j) \mod n}=c_{i,j}$. Note that if r>c we can define the permutation by cyclically shifting the columns. For example, if r=4 and n=4 $\tilde{C}$ is given by $$\tilde{C} = \begin{bmatrix} c_{0,0} & c_{0,1} & c_{0,2} & c_{0,3} \\ c_{1,3} & c_{1,0} & c_{1,1} & c_{1,2} \\ c_{2,2} & c_{2,3} & c_{2,0} & c_{2,1} \\ c_{3,1} & c_{3,2} & c_{3,3} & c_{3,0} \end{bmatrix}$$

The row $c_{0,j}$ represents the zero-shifted protection 222. The row $c_{1,j}$ represents the one-shifted protection 224. The row $c_{s,j}$ represents the N-shifted protection 226.

Thus, as shown below the final matrix, $C'=[c'_{i,j}]$ is an (r+2)×n matrix, where the first r rows could be the rows of D, the next row contains the column parities, and last row contains the permutation parities.

$$C' = \begin{bmatrix} d_{0,0} & \ldots & d_{0,n-1} \\ d_{r-1,0} & \ldots & d_{r-1,n-1} \\ p_0 & \ldots & p_{n-1} \\ \tilde{p}_0 & \ldots & \tilde{p}_{n-1} \end{bmatrix}$$

As an example, the decoding can be performed iteratively similar to the 2D RAID assist scheme as described above. As an example, a first attempt to decode each row with the row ECC or the sector redundancy 214. If there is exactly one uncorrectable row, computing system 100 can correct it using the column parity alone by flipping the bits in that row that correspond to the unsatisfied column parities. As a specific example, suppose that row i cannot be corrected with the row ECC and let $d*_{i,j}$ be the received version of $d_{i,j}$. We estimate $d_{i,j}$ as $\hat{d}_{i,j}=(\rho_j+d*_{i,j}) \mod 2$ where $$\rho_j = \left(\sum_{i=0}^{r-1} c*_{i,j}\right) \mod 2$$

is the re-computed column parity for column j and $c*_{i,j}$ is the received version of $c_{i,j}$.

If there are 2 or more uncorrectable rows we attempt to correct them using both the permuted parities and column parities. That is, for each bit in an uncorrectable row, we flip the bit if the two parties that cover that bit are both unsatisfied. In this case we estimate $d_{i,j}$ as $\hat{d}_{i,j}=(\hat{p}_{i,j}+d*_{i,j}) \mod 2$ where $\hat{p}_{i,j}=\rho_j \wedge \tilde{\rho}(i,j)$ is the logical "AND" of the re-computed column parity $\rho_k$ and the re-computed permutation parity, $\tilde{\rho}(i,j)$, for $d_{i,j}$. In particular, for the cyclically shifted example describe above, $$\tilde{\rho}(i,j) = \left(\tilde{p}*_{(i+j) \mod n} + \sum_{\ell,m \in I(i,j)} c*_{\ell,m}\right) \mod 2$$

where $\tilde{p}*_{(i+j) \mod n}$ is the received permutation parity computed with the bit $c_{i,j}$ and $I(i,j)=\{(l,m)|(l+m) \mod n=(i+j) \mod n\}$.

The process can repeat the decoding until all the uncorrectable rows have been corrected, a maximum number of iterations have been reached, or there is no change in the error pattern in response to the correction efforts.

There are various embodiment with several possible variations on this mechanism such as different constituent codes for the product code and/or different permutation mappings.

Figure 4:
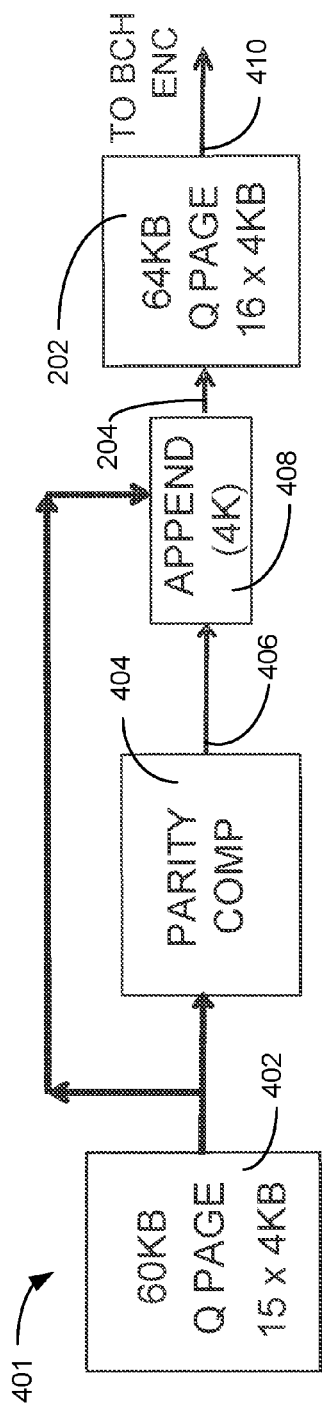
FIG. 4 is an example block diagram of an encoder for the shift data protection mechanism.

Referring now to FIG. 4, therein is shown a functional block diagram of an enhanced correction encoder 401 for the shift data protection mechanism in an embodiment. The functional block diagram of the enhanced correction encoder 401 depicts an encoder for the first protection 204.

In an embodiment, the data pages 208 of FIG. 2 can be configured to contain 4K bytes based on a number of the data sectors 210 of FIG. 2 processed by a sequencer unit 402, which sequentially submits 15 of the data pages 208 for processing by a parity computation unit 404. The sequencer unit 402 can be configured to submit the first data sector 210 for each of the data pages 208 in order to generate a sector parity 406. The sector parity 406 can provide the a portion of the zero-shifted protection 222 of FIG. 2, the one-shifted protection 224 of FIG. 2, through the N-shifted protection 226 of FIG. 2.

A protection append unit 408 can provide the first protection 204, which is assembled from the sector parity 406 in a sector-by-sector basis. The protection append unit 408 can load the first protection 204 into the data block 202, which can be configured as a 64K bytes of physical storage.

A protection block 410 can include the data contained in the data block 202, which includes the sector data 212 and the sector redundancy 214 for each of the data sectors 210 in each of the data pages 208. The protection block 410 can be used to generate a BCH code for each of the data pages 208 in the data block 202, which now includes the data page 208 holding the first protection 204.

Figure 5:
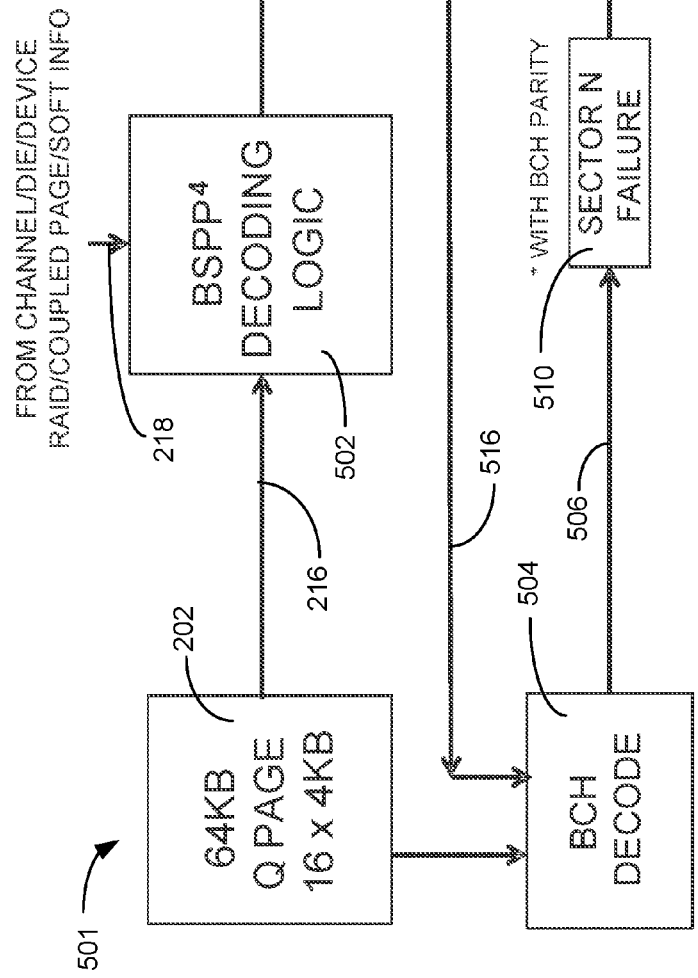
FIG. 5 is an example block diagram of a decoder for the shift data protection mechanism.

Referring now to FIG. 5, therein is shown a functional block diagram of an enhanced correction decoder 501 for the shift data protection mechanism in an embodiment. The functional block diagram of an enhanced correction decoder 501 depicts the data block 202 coupled to a BSPP⁴ decoding logic unit 502 and a BCH decoder 504. The data block 202 can pass the codeword 216 to the BSPP⁴ decoding logic unit 502. The BSPP⁴ decoding logic unit 502 can receive soft information 218 for characterizing likely failure modes. The BCH decoder 504 can propagate a sector error bus 506 upon detecting an erroneous BCH decode.

The BSPP⁴ ® decoding logic unit 502 can be coupled to a bit flip control unit 508. When the BCH decode 504 detects an error, a sector N failure unit 510 can present a sector error bus 511 to an XOR unit 512. The bit flip control unit 508 can provide inversion controls 514 that can perform corrections to the XOR unit 512 in order to form a corrected sector bus 516. The corrected sector bus 516 can be evaluated by the BCH decoder 504 in order to verify the correction.

It has been discovered that the enhanced correction decoder 501 can perform the second protection 216 of FIG. 2. The probability of detecting a sector error 506 after performing corrections by the first protection 204 is very slight. The combination of soft information 218 and the BCH decoder 504 is only invoked when the first protection 204 is incapable of correcting the error.

It is understood that data block 202 is shown to be 64K bytes, but that is reflective of the data content only and additional capacity is required to contain the data block 202. It is further understood that the data content of the data block 202 can be 32K bytes, 16K bytes, or another size without changing the operation of the computing system 100 of FIG. 1.

Figure 6:
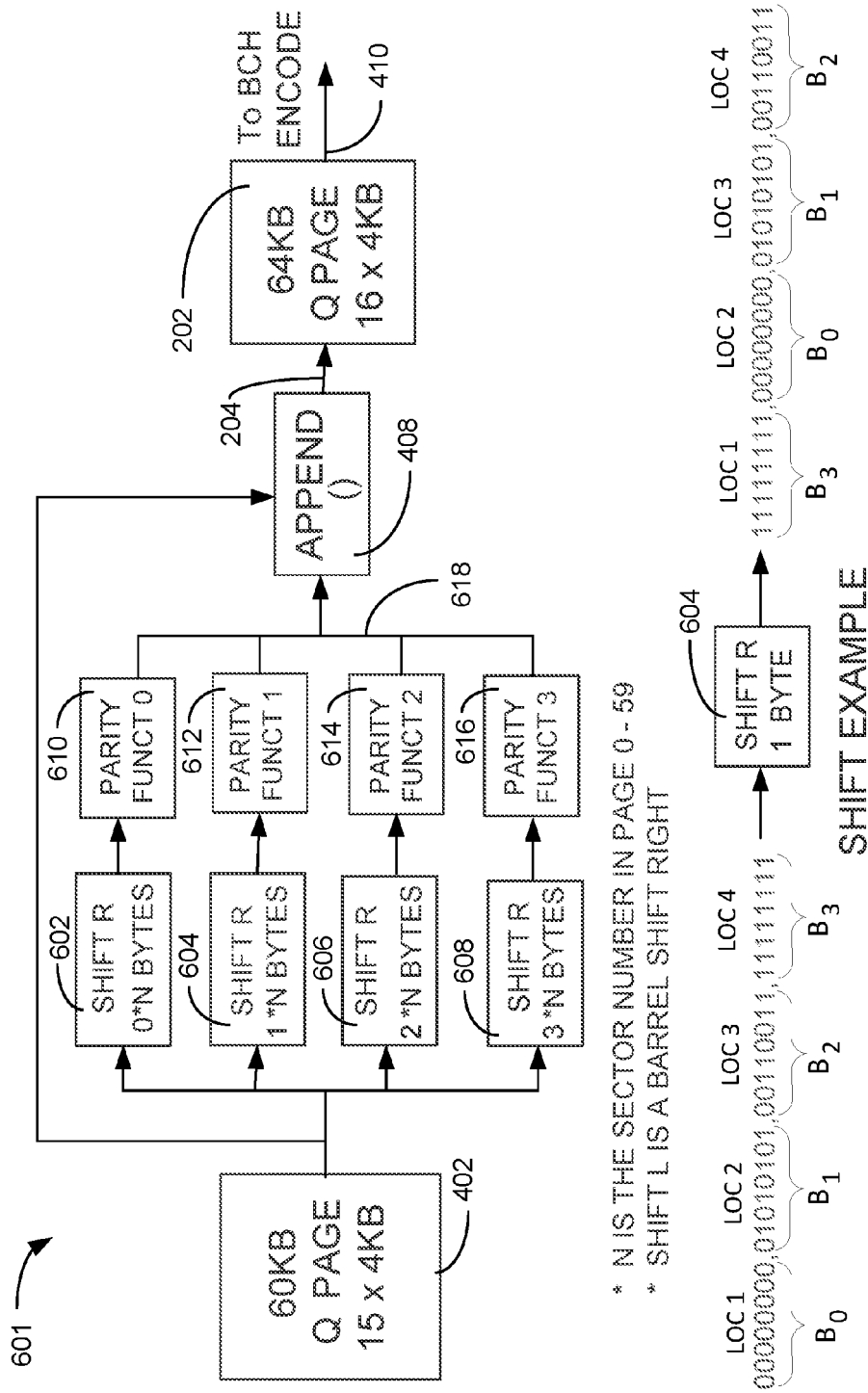
FIG. 6 is an example detailed block diagram of the encoder.

Referring now to FIG. 6, therein is shown a functional block diagram of an enhanced correction encoder 601 for the shift data protection mechanism in an embodiment. The functional block diagram of the enhanced correction encoder 601 can depict the encoder for the first protection 204 of FIG. 2. for the embodiment of the enhanced correction encoder 601 includes shifters for the zero-shifted protection 222 of FIG. 2, one-shifted protection 224 of FIG. 2, through N-shifted protection 226 of FIG. 2.

In an embodiment, the data pages 208 can be processed by the first encoder, which generates the zero-shifted protection 222 of FIG. 2, one-shifted protection 224 of FIG. 2, through N-shifted protection 226 of FIG. 2.

The data pages 208 of FIG. 2 can be configured to contain 4K bytes based on a number of the data sectors 210 of FIG. 2 processed by the sequencer unit 402, which sequentially submits 15 of the data pages 208 for processing by a zero byte right shifter 602, a one byte right shifter 604, a two byte right shifter 606 and a three byte right shifter 608. It is understood that the number of the shifters is an example only and can be implemented with a different number of the shifters.

A parity function 0 unit 610 can be coupled to the zero byte right shifter 602 for generating the zero-shifted protection 222 of FIG. 2 to be presented on a parity bus 618. The parity function 0 unit 610 can be an XOR function, a polynomial function, or a combination thereof.

A parity function 1 unit 612 can be coupled to the one byte right shifter 604 for generating the one-shifted protection 224 of FIG. 2 to be presented on a parity bus 618. The parity function 1 unit 612 can be an XOR function, a polynomial function, or a combination thereof.

A parity function 2 unit 614 can be coupled to the two byte right shifter 606 for presenting a two-shifted protection on a parity bus 618. The parity function 2 unit 614 can be an XOR function, a polynomial function, or a combination thereof.

A parity function 3 unit 616 can be coupled to the three byte right shifter 608 for presenting a three-shifted protection on a parity bus 618. The parity function 3 unit 616 can be an XOR function, a polynomial function, or a combination thereof.

The parity bus 618 can provide the a portion of the zero-shifted protection 222, the one-shifted protection 224, through the N-shifted protection 226 concurrently for generation of the first protection 204. By generating the first protection 204 in multiple configurations concurrently can allow switching the first protection 204 at any time without reprocessing the data block 202.

The protection append unit 408 can provide the first protection 204, which is assembled from the sector parity 406 in a sector-by-sector basis. The protection append unit 408 can load the first protection 204 into the data block 202, which can be configured as a 64K bytes of physical storage.

The protection block 410 can include the data contained in the data block 202, which includes the sector data 212 and the sector redundancy 214 for each of the data sectors 210 in each of the data pages 208. The protection block 410 can be used to generate a BCH code for each of the data pages 208 in the data block 202, which now includes the data page 208 holding the first protection 204.

By way of an example the one byte right shifter 604 can receive a four byte string of data, where $B_0$ is 00 hex, $B_1$ is 55 hex, $B_2$ is 33 hex, and $B_3$ is FF hex. The one byte right shifter 604 can operate as a shift right barrel shifter to rotate the location of $B_0$, $B_1$, and $B_2$ to LOC 2, LOC3, and LOC 4 respectively. In the same shift $B_3$ is moved from LOC 4 to LOC 1. Similarly, the two byte right shifter 606 can, for example, rotate $B_0$ from LOC 1 to LOC 3 in a single cycle and the three byte right shifter 608 can rotate $B_0$ from LOC 1 to LOC 4 in a single cycle. It is understood that the other bytes, $B_1$, $B_2$, and $B_3$, are similarly rotated. It is also understood that while four sets of the shifters is used for the explanation a different number of the shifters can be implemented.

Figure 7:
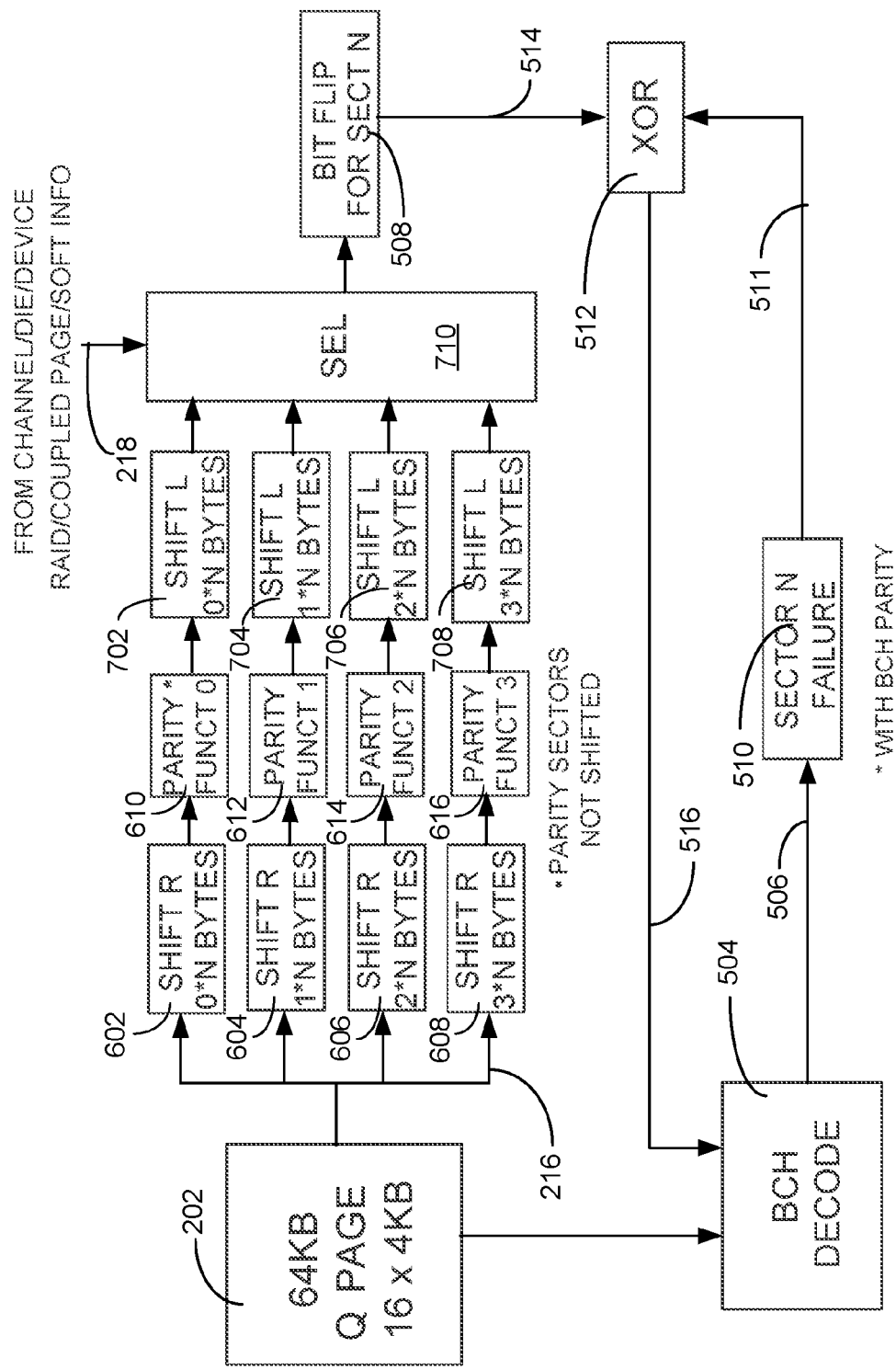
FIG. 7 is an example detailed block diagram of the decoder.

Referring now to FIG. 7, therein is shown a functional block diagram of an enhanced correction decoder 701 for the shift data protection mechanism in an embodiment. The functional block diagram of an enhanced correction decoder 701 depicts the data block 202 coupled to the zero byte right shifter 602, the one byte right shifter 604, the two byte right shifter 606, the three byte right shifter 608, and the BCH decoder 504. It is understood that the number of the shifters is an example only and can be implemented with a different number of the shifters.

The parity function 0 unit 610 can be coupled to the zero byte right shifter 602 for generating the zero-shifted protection 222 of FIG. 2 to be presented on a parity bus 618. The parity function 0 unit 610 can be an XOR function, a polynomial function, or a combination thereof. The parity function 0 unit 610 can be coupled to a zero byte left shifter 702.

The parity function 1 unit 612 can be coupled to the one byte right shifter 604 for generating the one-shifted protection 224 of FIG. 2 to be presented on a parity bus 618. The parity function 1 unit 612 can be an XOR function, a polynomial function, or a combination thereof. The parity function 1 unit 612 can be coupled to a one byte left shifter 704.

The parity function 2 unit 614 can be coupled to the two byte right shifter 606 for presenting a two-shifted protection on a parity bus 618. The parity function 2 unit 614 can be an XOR function, a polynomial function, or a combination thereof. The parity function 2 unit 614 can be coupled to a two byte left shifter 706.

The parity function 3 unit 616 can be coupled to the three byte right shifter 608 for presenting a three-shifted protection on a parity bus 618. The parity function 3 unit 616 can be an XOR function, a polynomial function, or a combination thereof. The parity function 3 unit 616 can be coupled to a three byte left shifter 708.

The zero byte left shifter 702, the one byte left shifter 704, the two byte left shifter 706, and the three byte left shifter 708 can be coupled to a selector 710. The selector 710 can be controlled by the soft information 218 for selecting an appropriate level of the first protection 204 of FIG. 2 for correcting the sector error bus 506 upon detecting the erroneous BCH decode.

The selector 710 can provide propagate the correction bits for the bit flip control unit 508. When the BCH decode 504 detects an error, the sector N failure unit 510 can present the sector error bus 511 to the XOR unit 512. The bit flip control unit 508 can provide inversion controls 514 that can perform corrections to the XOR unit 512 in order to form the corrected sector bus 516. The corrected sector bus 516 can be evaluated by the BCH decoder 504 in order to verify the correction.

It has been discovered that the enhanced correction decoder 701 can perform the second protection 216 of FIG. 2. The probability of detecting the sector error 506 after performing corrections by the first protection 204 is very slight. The combination of soft information 218 and the BCH decoder 504 is only invoked when the first protection 204 is incapable of correcting the error.

It is understood that data block 202 is shown to be 64K bytes, but that is reflective of the data content only and additional capacity is required to contain the data block 202. It is further understood that the data content of the data block 202 can be 32K bytes, 16K bytes, or another size without changing the operation of the computing system 100 of FIG. 1.

Figure 8:
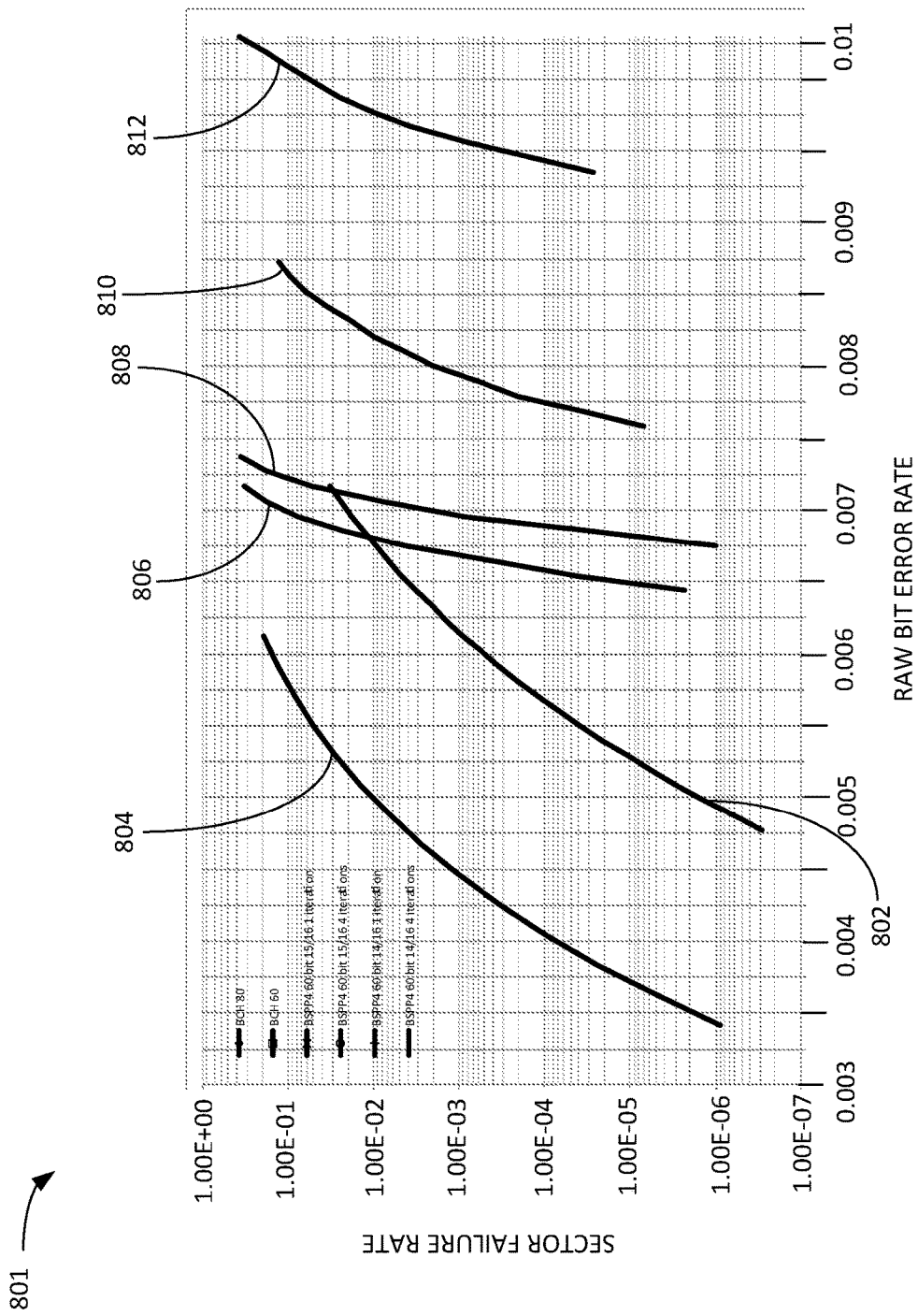
FIG. 8 is a graph depicting an example improvement in an embodiment of the present invention.

Referring now to FIG. 8, therein is shown a graph 801 depicting an example improvement in an embodiment of the present invention. The graph 801 depicts relative error rates for a BCH 80 code 802, a BCH 60 code 804, a BSPP$^4$ 60 (15/16) code 806 in a single iteration, a BSPP$^4$ 60 (15/16) code 808 having 4 iterations, BSPP$^4$ 60 (14/16) code 810 in a single iteration, and a BSPP$^4$ 60 (14/16) code 812 having 4 iterations.

The relative performance of the error correction schemes can be related by their latency as well. The BCH 80 code 802 and the BCH 60 code 804 can have a worst case latency of 4 micro-seconds. The BSPP$^4$ 60 (15/16) code 806 and the BSPP$^4$ 60 (14/16) code 810 can have a single iteration latency of 100 micro-seconds. The BSPP$^4$ 60 (15/16) code 808 and the BSPP$^4$ 60 (14/16) code 812 having a four iteration latency of 120 micro-seconds. The first protection 204 of FIG. 2 used as a RAID parity can have a latency of 250 micro-seconds. The second protection 206 of FIG. 2, utilizing the soft information 218 of FIG. 2 can have a latency of 350 micro-seconds.

For illustrative purposes, the computing system 100 is described operating on the data block 202 of FIG. 2, the first protection 204 of FIG. 2, and the second protection 206 of FIG. 2 independent of location. It is understood that the data storage system 101 of FIG. 1, the storage engine 115 of FIG. 1, the DAS devices of FIG. 1, the network attached storage devices 122 of FIG. 1 can provide the data block 202, the first protection 204, the second protection 206, or a combination thereof. The data block 202 can also represent the non-volatile memory 112, the memory devices 117, the solid state disk 110, the hard disk drives 116, or a combination thereof.

The functions described in this application can be implemented as instructions stored on a non-transitory computer readable medium to be executed by the host central processing unit 104 of FIG. 1, the data storage system 101, the storage engine 115, or a combination thereof. The non-transitory computer medium can include the host memory of FIG. 1, the DAS devices of FIG. 1, the network attached storage devices 122, the non-volatile memory 112, the memory devices 117, the solid state disk 110, the hard disk drives 116, or a combination thereof. The non-transitory computer readable medium can include compact disk (CD), digital video disk (DVD), or universal serial bus (USB) flash memory devices. The non-transitory computer readable medium can be integrated as a part of the computing system 100 or installed as a removable portion of the computing system 100.

Figure 9:
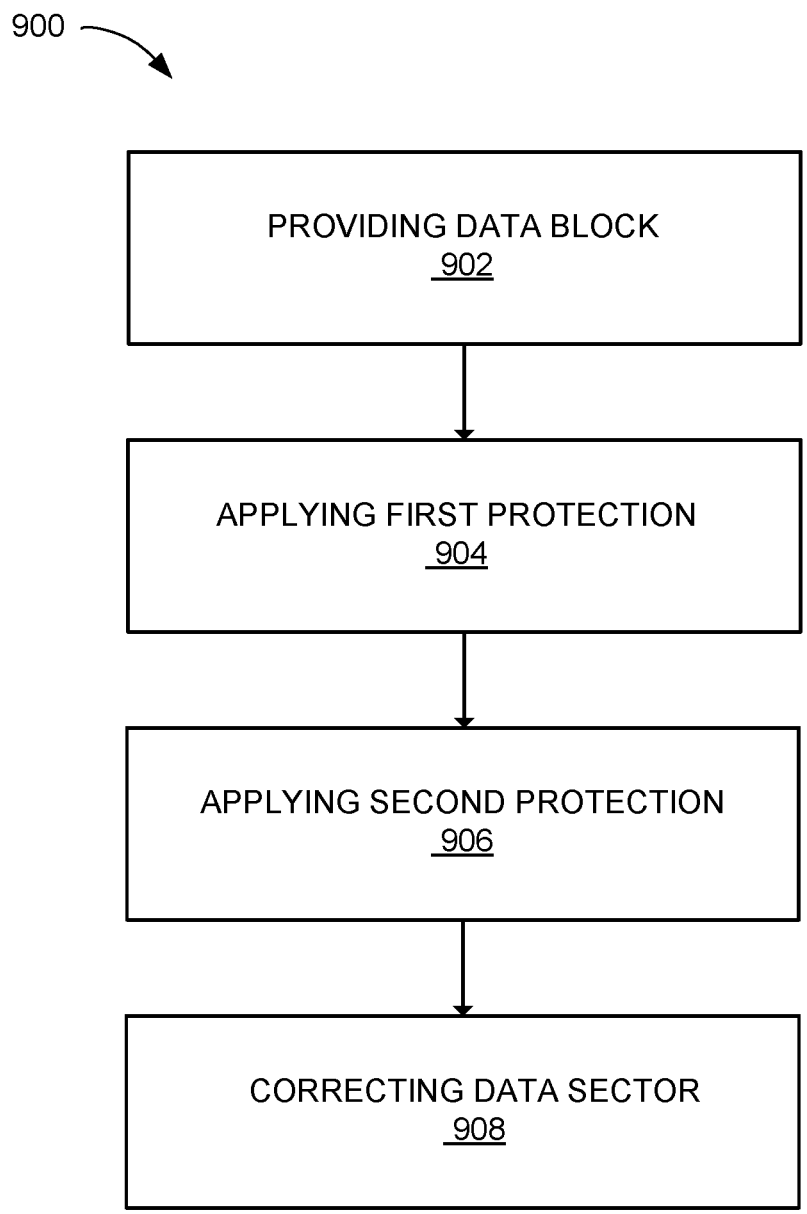
FIG. 9 is a flow chart of a method of operation of a computing system in an embodiment of the present invention.

Referring now to FIG. 9, therein is shown a flow chart of a method 900 of operation of a computing system 100 in an embodiment of the present invention. The method 900 includes: providing a data block including data pages and each of the data pages includes data sectors and each of the data sectors include sector data and a sector redundancy in a block 902; applying a first protection across the data pages including generating shifted parities in a block 904; applying a second protection across the data sectors in a block 906; and correcting at least one of the data sectors when a sector correction with the sector redundancy failed by selecting one of the shifted parities for the first protection and the second protection in a block 908.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising: a data block including data pages and each of the data pages includes data sectors and each of the data sectors includes sector data and a sector redundancy; a storage engine, coupled to the data block, configured to: apply a first protection across the data pages including an enhanced correction encoder submitting the data pages to shifter 0 through shifter N concurrently for shifted parities applied to columns of the data block, apply a second protection across the data sectors, and correct at least one of the data sectors when a sector correction with the sector redundancy failed by selecting one of the shifted parities for the first protection and the second protection.

2. The system as claimed in claim 1 wherein the storage engine is further configured to correct the sector data with the sector redundancy before correcting with the first protection, the second protection, or a combination thereof.

3. The system as claimed in claim 1 wherein the storage engine is further configured to apply the first protection as a parity page across the data pages based on the shifted parities.

4. The system as claimed in claim 1 wherein the storage engine is further configured to apply the second protection as a parity sector across the data sectors includes a bit flip control unit to interpret the shifted parities.

5. The system as claimed in claim 1 wherein the storage engine is further configured to correct at least one of the data sectors with the first protection and the second protection by flipping a bit in the data sectors.

6. The system as claimed in claim 1 wherein the storage engine is further configured to apply the second protection as a row-enhanced Hamming code.

7. The system as claimed in claim 1 wherein the storage engine is further configured to correct the sector data with the sector redundancy.

8. The system as claimed in claim 1 wherein the data block includes a super block.

9. The system as claimed in claim 1 wherein the data block includes a hard disk drive, solid state disk drive, a memory device, or a combination thereof.

10. The system as claimed in claim 1 wherein the storage engine is further configured to apply the first protection including soft information associated to at least one of the data pages to select one of the shifted parities.

11. A method of operation of a computing system comprising:
providing a data block including data pages and each of the data pages includes data sectors and each of the data sectors include sector data and a sector redundancy;
applying a first protection across the data pages including submitting the data pages to shifter 0 through shifter N concurrently by an enhanced correction encoder for applying shifted parities to columns of the data block;
applying a second protection across the data sectors; and
correcting at least one of the data sectors when a sector correction with the sector redundancy failed by selecting one of the shifted parities for the first protection and the second protection.

12. The method as claimed in claim 11 further comprising correcting the sector data with the sector redundancy before correcting with the first protection, the second protection, or a combination thereof.

13. The method as claimed in claim 11 wherein applying the first protection includes applying a parity page across the data pages based on the shifted parities.

14. The method as claimed in claim 11 wherein applying the second protection includes applying a parity sector across the data sectors including interpreting the shifted parities.

15. The method as claimed in claim 11 wherein correcting at least one of the data sectors with the first protection and the second protection includes flipping a bit in the data sectors.

16. The method as claimed in claim 11 wherein applying the second protection includes applying a row-enhanced Hamming code.

17. The method as claimed in claim 11 further comprising correcting the sector data with the sector redundancy.

18. The method as claimed in claim 11 wherein providing the data block includes providing a super block.

19. The method as claimed in claim 11 wherein providing a hard disk drive, solid state disk drive, a memory device, or a combination thereof.

20. The method as claimed in claim 11 wherein applying the first protection includes applying soft information associated to at least one of the data pages for selecting one of the shifted parities.

21. A non-transitory computer readable medium including instructions for execution, the medium comprising:
providing a data block including data pages and each of the data pages includes data sectors and each of the data sectors include sector data and a sector redundancy;
applying a first protection across the data pages including submitting the data pages to shifter 0 through shifter N concurrently by an enhanced correction encoder for generating shifted parities applied to columns of the data block;
applying a second protection across the data sectors; and
correcting at least one of the data sectors when a sector correction with the sector redundancy failed by selecting one of the shifted parities for the first protection and the second protection.

22. The medium as claimed in claim 21 further comprising correcting the sector data with the sector redundancy before correcting with the first protection, the second protection, or a combination thereof.

23. The medium as claimed in claim 21 wherein applying the first protection includes applying a parity page across the data pages based on the shifted parities.

24. The medium as claimed in claim 21 wherein applying the second protection includes applying a parity sector across the data sectors including interpreting the shifted parities.

25. The medium as claimed in claim 21 wherein correcting at least one of the data sectors with the first protection and the second protection includes flipping a bit in the data sectors.

26. The medium as claimed in claim 21 wherein applying the second protection includes applying a row-enhanced Hamming code.

27. The medium as claimed in claim 21 further comprising correcting the sector data with the sector redundancy.

28. The medium as claimed in claim 21 wherein providing the data block includes providing a super block.

29. The medium as claimed in claim 21 wherein providing the data block includes providing a hard disk drive, solid state disk drive, a memory device, or a combination thereof.

30. The medium as claimed in claim 21 wherein applying the first protection includes applying soft information associated to at least one of the data pages for selecting one of the shifted parities.

* * * * *